(12) United States Patent
Zeng et al.

(10) Patent No.: US 11,102,641 B2
(45) Date of Patent: Aug. 24, 2021

(54) SIM CARD STATUS DETERMINATION METHOD AND SIM CARD STATUS DETERMINATION DEVICE

(71) Applicant: SHENZHEN UCLOUDLINK NEW TECHNOLOGY CO., LTD., Shenzhen (CN)

(72) Inventors: Cangsong Zeng, Shenzhen (CN); Zhihui Gong, Shenzhen (CN); Zhihong Liu, Shenzhen (CN); Linbo Liu, Shenzhen (CN)

(73) Assignee: SHENZHEN UCLOUDLINK NEW TECHNOLOGY CO., LTD., Shenzhen (CN)

( * ) Notice: Subject to any disclaimer, the term of this patent is extended or adjusted under 35 U.S.C. 154(b) by 40 days.

(21) Appl. No.: 16/740,141

(22) Filed: Jan. 10, 2020

(65) Prior Publication Data
US 2020/0154265 A1  May 14, 2020

Related U.S. Application Data

(63) Continuation-in-part of application No. PCT/CN2018/094513, filed on Jul. 4, 2018.

(30) Foreign Application Priority Data

Jul. 10, 2017 (CN) .......................... 201710554686.2

(51) Int. Cl.
*H04W 8/18* (2009.01)
*H04W 8/20* (2009.01)
(Continued)

(52) U.S. Cl.
CPC ............ *H04W 8/205* (2013.01); *G06N 20/00* (2019.01); *H04W 8/183* (2013.01); *H04W 8/26* (2013.01)

(58) Field of Classification Search
CPC ....... H04W 8/205; H04W 8/183; H04W 8/26; H04W 24/08; H04W 8/18; G06N 20/00;
(Continued)

(56) References Cited

U.S. PATENT DOCUMENTS

2016/0249408 A1* 8/2016 Thiruvenkatachari ...................... H04W 76/38
2018/0288584 A1* 10/2018 Zhang ................... H04W 76/10

FOREIGN PATENT DOCUMENTS

CN    104536869 A    4/2015
CN    104683388 A    6/2015
(Continued)

*Primary Examiner* — Said M Elnoubi
(74) *Attorney, Agent, or Firm* — Robert L. Stearns; Dickinson Wright, PLLC

(57) ABSTRACT

The present disclosure provides a SIM card status determination method and a SIM card status determination device, the SIM card status determination method includes: acquiring feature data of a SIM card of a terminal device, determining a use status of the SIM card according to the feature data and a preset recognition model, sending a SIM card releasing request to the terminal device to cause the terminal device to release the SIM card if the use status is determined as idle, acquiring SIM card using request data which is sent by the terminal device after the SIM card is released, and optimizing the preset recognition model according to the SIM card using request data, thereby determining the use status of the SIM card using optimized recognition model.

15 Claims, 6 Drawing Sheets

(51) Int. Cl.
*G06N 20/00* (2019.01)
*H04W 8/26* (2009.01)
(58) Field of Classification Search
CPC ........ G06N 5/003; G06N 7/005; G06N 20/20; G06N 3/08
See application file for complete search history.

(56) References Cited

FOREIGN PATENT DOCUMENTS

| | | |
|---|---|---|
| CN | 105120448 A | 12/2015 |
| CN | 106658569 A | 5/2017 |
| CN | 107333292 A | 11/2017 |
| KR | 20170096360 A | 8/2017 |

\* cited by examiner

SIM CARD STATUS DETERMINATION METHOD AND SIM CARD STATUS DETERMINATION DEVICE

CROSS REFERENCE TO RELATED APPLICATION

This application is a continuation-in-part of PCT Patent Application Ser. No. PCT/CN2018/094513, filed on Jul. 4, 2018, which claims priority to Chinese Patent Application Ser. No. CN201710554686.2, filed on Jul. 10, 2017, the entire disclosures of which are incorporated herein by reference in their entireties.

TECHNICAL FIELD

The present disclosure relates to the field of communications, and more particularly to a SIM card status determination method and a SIM card status determination device.

BACKGROUND

With the progress of science and technology and the improvement of people's life level, worldwide people's communication and exchange are closer and closer, the frequency of going abroad is continuously increased, when being abroad, network services are always needed by many activities of people such as travelling, shopping, business activities, and instant messaging, and so on, and the implementation of these network services needs to consume a large amount of data traffic; however, a terminal device which surfs the internet locally through a cloud SIM (Subscriber Identity Module) card may meet these network requirements of users who are abroad.

The same SIM card may only serve one user at the same time. The user may usually make a request proactively when he/she needs to use a SIM card; however, when the SIM card is not used, the user may not explicitly indicate that the SIM card need not to be used currently. At this time, the SIM card is occupied by the user, however, the user does not use data service, the SIM card will not be released proactively, so that an ineffective utilization of the SIM card is caused.

In the research and practice of the prior art, the inventor of the present disclosure finds that the prior art has the following problems that: the existing method of identifying and releasing an ineffectively utilized SIM card is implemented by determining a use status of a SIM card according to a fixed preset period of time and a fixed data traffic threshold, for example, when the data traffic of the SIM card reported by the terminal device within a certain time is less than a threshold value, the user is considered as not using the data service, and the SIM card is determined as in an idle state, so that the SIM card occupied by the user is released. However, determining the use status of the SIM card according to the fixed preset period of time and the fixed data traffic threshold has a problem of low determination accuracy.

SUMMARY

The present disclosure provides a SIM card status determination method which aims at solving the problem in the prior art the determination accuracy is low.

The present disclosure is implemented in this way, a SIM card status determination method, where the SIM card is the one stored in a cloud SIM card pool and being assigned to a terminal device to be used through a server, the method comprises steps of:

acquiring SIM card feature data of a terminal device by the server, where the feature data includes SIM card data traffic;

determining a use status of the SIM card by the server according to the feature data and a preset recognition model;

sending a SIM card releasing request to the terminal device to cause the terminal device to release the SIM card by the server, if the use status is determined as idle;

acquiring SIM card using request data sent by the terminal device; and optimizing, by the server, the preset recognition model according to the SIM card using request data so as to determine the use status of the SIM card according to optimized recognition model.

The present disclosure further provides a server, the server includes a processor configured to execute a computer program stored in a system memory so as to implement steps of:

acquiring SIM card feature data of a terminal device, wherein the feature data comprises SIM card data traffic;

determining a use status of the SIM card according to the feature data and a preset recognition model;

sending a SIM card releasing request to the terminal device to cause the terminal device to release the SIM card, if the use status is determined as idle;

acquiring SIM card using request data sent by the terminal device; and optimizing the preset recognition model according to the SIM card using request data so as to determine the use status of the SIM card according to optimized recognition model.

Furthermore, the processor is further configured to execute the computer program in the memory to implement:

before the step of determining a use status of the SIM card according to the feature data and a preset recognition model, acquiring feature data of the SIM card with a determined use status; and taking the feature data of the SIM card with the determined use status as training data, and training the preset recognition model using a supervised learning algorithm.

Furthermore, the processor is further configured to execute the computer program in the memory to implement:

excluding the feature data of the SIM card if the data traffic of the SIM card is greater than a preset value, before the step of determining a use status of the SIM card according to the feature data and a preset recognition model.

Furthermore, the processor is specifically configured to implement the step of optimizing the preset recognition model according to the SIM card using request data so as to determine the use status of the SIM card according to optimized recognition model by determining the SIM card released by the terminal device as an idle SIM card or a non-idle SIM card according to the SIM card using request data; and performing an optimal training on the preset recognition model using the feature data of the idle SIM card and/or the non-idle SIM card so as to adjust parameters of the preset recognition model.

Furthermore, the processor is specifically configured to implement the step of determining the SIM card released by the terminal device as an idle SIM card or a non-idle SIM card according to the SIM card using request data by determining the SIM card as the idle SIM card if the terminal device doesn't request to use the SIM card in the preset period of time, or determining the SIM card as the non-idle SIM card if the terminal device requests to use the SIM card in the preset period of time, according to the SIM card using request data of the terminal device in a preset period of time after the SIM card is released by the terminal device.

Furthermore, the processor is further configured to implement the step of marking the released SIM card as a frozen state in a preset period of time; and directly allocating the SIM card marked as the frozen state to the terminal device to be used, if the terminal device which has released the SIM card requests to use the SIM card again during this period of time; or fully releasing this SIM card and allowing the SIM card to be allocated to other terminal devices to be used, if the terminal device doesn't request to use the SIM card during this period of time, after the step of sending a SIM card releasing request to the terminal device to cause the terminal device to release the SIM card by the server, if the use status is determined as idle.

Furthermore, the processor is specifically configured to implement the step of optimizing the preset recognition model according to the SIM card using request data so as to determine the use status of the SIM card according to optimized recognition model by:

acquiring the SIM card using request data reissued by the terminal device after the SIM card is released and taking the acquired SIM card using request data as feedback data to further adjust the recognition model according to whether a determination of use status of the SIM card is correct.

The present disclosure further provides a computer readable storage medium which stores a computer program, where when the computer program is executed by a processor, steps in the SIM card status determination method provided by the present disclosure is implemented.

The SIM card status determination method provided by the present disclosure is applicable to the SIM card stored in a cloud SIM card pool and allocated to the terminal device to be used through the server, SIM card feature data of the terminal device which contains SIM card data traffic is acquired, and the use status of the SIM card is determined according to the feature data and the preset recognition model, if the SIM card is in an idle state, a SIM card releasing request is sent to the terminal device to release the SIM card, after the SIM card is released, the SIM card using request data sent by the terminal device is acquired, and the recognition model is further optimized according to the SIM card using request data, so that the optimized recognition model is used to determine the use status of the SIM card, and a purpose of improving the determination accuracy is ultimately achieved.

BRIEF DESCRIPTION OF THE DRAWINGS

Other advantages of the embodiments of present invention will be readily appreciated, as same becomes better understood by reference to the following detailed description when considered in connection with the accompanying drawings wherein.

DESCRIPTION OF THE ENABLING EMBODIMENT

In order to make the purpose, the technical solution and the advantages of the present disclosure be clearer and more understandable, the present disclosure will be further described in detail below with reference to accompanying figures and embodiments. It should be understood that the specific embodiments described herein are merely intended to illustrate but not to limit the present disclosure.

Figure 1:
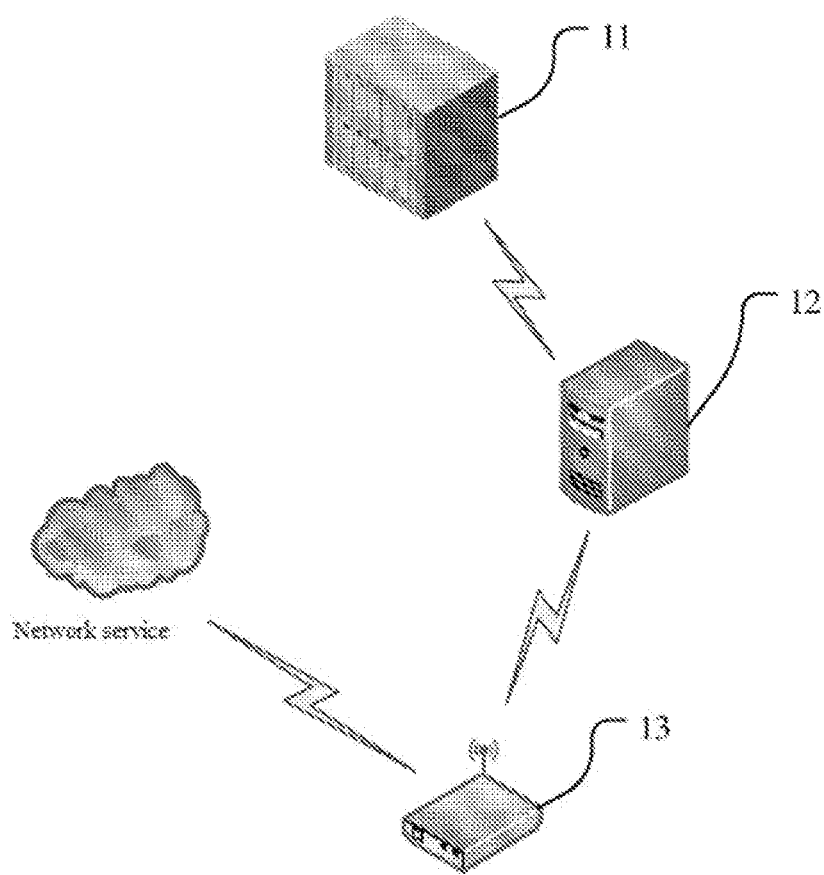
FIG. 1 is a schematic diagram of an implementation environment of a SIM card status determination method according to an embodiment of the present disclosure.

FIG. 1 illustrates a schematic diagram of an application environment according to an embodiment of the present disclosure, for the convenience of description, contents relevant to the embodiments of the present disclosure are shown merely, which are described in detail below:

A cloud SIM (Subscriber Identity Module) card pool 11 has a plurality of card slots for centrally stored physical SIM cards, the countries which the stored physical SIM cards belongs to, network carriers, tariff package to be used and applicable network standards may all be different.

A server 12 is configured to allocate a cloud SIM card accessible to the network service to a terminal device 13, maintain a communication channel which is established by the server 12 and the terminal 12, receive data from the terminal device 12 and send data and instructions to the terminal device 12.

The terminal device 13 is configured to access the network through the cloud SIM card, may access the network service, and may also serve as a mobile Wi-Fi (Wireless Fidelity) hotspot to provide network services for other devices.

In the embodiment of the present disclosure, the terminal device 13 is specifically configured to acquire the cloud SIM card allocated by the server 12, and then actuate the cloud SIM card and register the mobile network to access the network service after logging in the server 12, the terminal device 13 may also serve as a mobile Wi-Fi hotspot to provide network services for other devices.

In an application environment of the embodiment of the present disclosure, there may be one or a plurality of cloud SIM card pools 11, servers 12, and terminal devices 13, which are provided according to the actual condition and without limitation.

Figure 2:
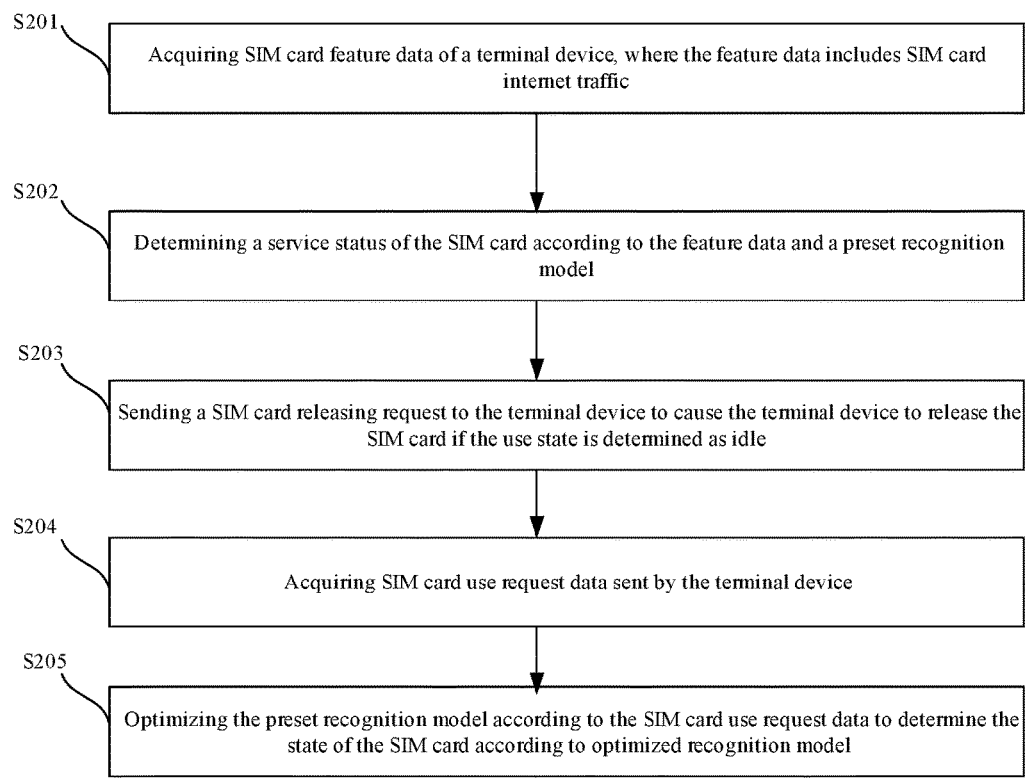
FIG. 2 is a schematic diagram of steps of a SIM card status determination method according to an embodiment of the present disclosure.

FIG. 2 illustrates a schematic flowchart of a SIM card status determination method according to one embodiment of the present disclosure, which is described in detail below:

step 201, acquiring SIM card feature data of the terminal device 13 by the server 400, where the feature data includes SIM card data traffic.

In this embodiment of the present disclosure, the acquired feature data of the SIM card includes SIM card data traffic, and may also include data or information related to the SIM card such as a district where the SIM card is distributed, a telecommunication carrier which the SIM card belongs to, an access network standard (GSM/WCDMA/LTE, etc.), an access network time duration, SIM card data traffic, time of generation of data traffic, a region where the data traffic is generated, etc. The present disclosure is described in detail below by taking the SIM card data traffic as an example.

Figure 3:
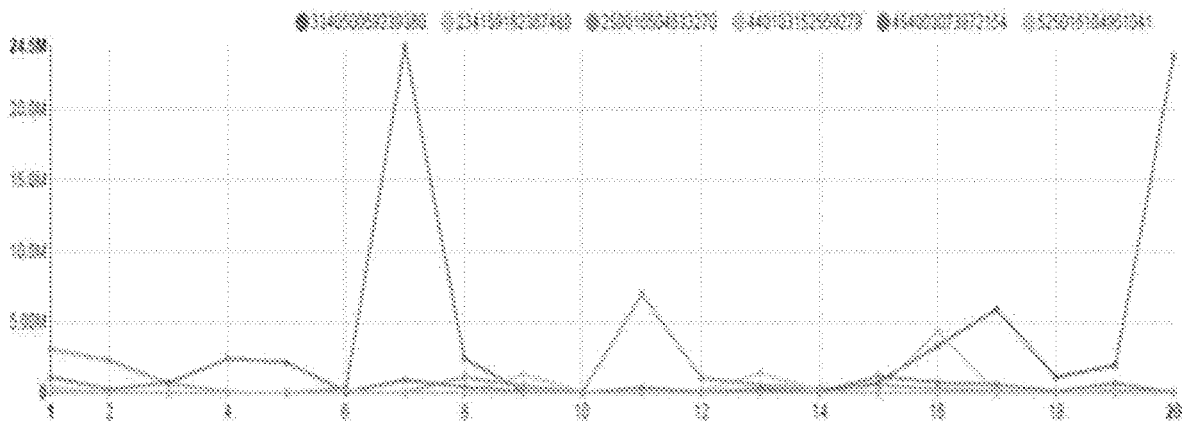
FIG. 3 is a curve diagram of one kind of feature data according to an embodiment of the present disclosure.

As shown in FIG. 3, when the SIM card data traffic is used as the feature data, data traffic generated within a specific time granularity range may be acquired, continuous data traffic constitutes an data traffic feature vector. For example, an data traffic generated every 3 minutes is A, 20 continuous data traffic feature values are generated within the last 1 hour, these feature values are arranged in a chronological order to constitute a traffic feature vector [$a1, a2, a3 \ldots a20$], where $a20$ represents a point closest from the current time, $a1$ represents a point before 1 hour from the current time. Numbers including "334050059239380", "234159182387480", "250016504633270" in FIG. 3 may serve as identification codes of SIM cards, a corresponding SIM card may be retrieved and identified in this step and subsequent steps according to these identification codes, the points in FIG. 3 represents the data traffic generated by the SIM card in every 3 minutes, there are 20 points in 1 fold line, these points represents the traffic feature vectors [$a1, a2, a3 \ldots a20$], 6 fold lines in FIG. 3 represent the traffic feature vectors of 6 SIM cards.

It needs to be explained that, except for SIM card data traffic, the data or information relating to the SIM card and known to the person of ordinary skill in the art such as a district which the SIM card belongs to, a telecommunication carrier which the SIM card belongs to, an access network standard, an access network time duration, SIM card data traffic, time of generation of data traffic, and a region where the data traffic is generated may be taken as the feature data of the SIM card, a combination of various data or information may also be taken as the feature data, selection of feature data of the SIM card may be made and adjusted dynamically according to the actual condition.

Step 202, determining the use status of the SIM card according to the feature data and a preset recognition model by the server 400.

In this embodiment of the present disclosure, the preset recognition model is configured to determine a SIM card with an idle use status, the SIM card feature data acquired in the step 201 is matched with the preset recognition model, the SIM card is determined as idle if the matching is successful; otherwise, the SIM card is determined as non-idle; the SIM card may also be marked to facilitate execution of subsequent steps. For the SIM card which is determined as idle, the information and the feature data of the SIM card may be stored so as to be called by subsequent steps, so that repeatedly acquiring the feature data of a target SIM card in a subsequent step may be avoided, and an execution speed of the subsequent steps may be accelerated.

In the embodiment of the present disclosure, a machine learning algorithm, especially a supervised learning algorithm such as a decision tree, a random forest, a Bayesian classification algorithm, an artificial neural network, etc, which takes the traffic feature vector [$a1, a2, a3 \ldots a20$] as an example, may be used when the feature data of the SIM card matches with the preset recognition model.

Figure 4:
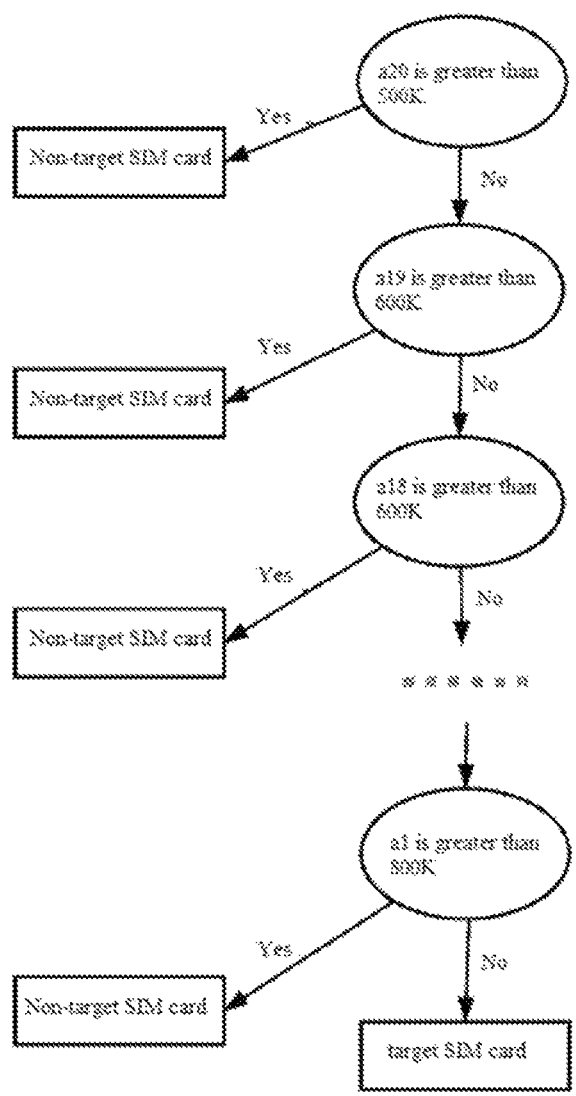
FIG. 4 is a schematic flow diagram of matching with a preset recognition model according to an embodiment of the present disclosure.

As shown in FIG. 4, after the SIM card traffic data is acquired to constitute a traffic feature vector [$a1, a2, a3 \ldots a20$], values of the feature vector [$a1, a2, a3 \ldots a20$] are compared with the parameters of the preset recognition model sequentially, if the value of $a20$ is greater than 500K, matching with the preset recognition model is failed, and the use status of the SIM card is determined as non-idle; if the value of $a20$ is not greater than 500K, the value of $a19$ is compared with the parameters of the preset recognition model, if $a19$ is greater than 600K, matching with the preset recognition model is failed, and the use status of the SIM card is determined as non-idle; if the value of $a19$ is not greater than 600K, then, the value of $a18$ is compared with the parameters of the preset recognition model; the aforesaid steps are repeatedly performed until $a1$ is compared with the parameters of the preset recognition model, if the value of $a1$ is greater than 800K, the matching fails, the use status of the SIM card is determined as non-idle, if the value of $a1$ is not greater than 800 K, the matching is successful, and the use status of the SIM card is determined as idle.

It needs to be noted that, the examples described above are merely simpler implementation mode of step 202, except for comparison of traffic values in the order of [$a20, a19, a18 \ldots a1$], the comparison of traffic values may also be performed in the order of [$a1, a2, a3 \ldots a20$] or in an out-of-order, the comparison of traffic values may also be performed randomly and without order and may also be compared one time, some feature vectors may also be extracted from [$a1, a2, a3 \ldots a20$] to be compared so as to reduce computational burden, more or less data may also be acquired, variations are not enumerated herein, the specific algorithms and matching approach may be selected according to actual condition, and this embodiment of the present disclosure is not taken as a limitation to the protection scope of the present disclosure.

Step 203, sending a SIM card releasing request to the terminal device to cause the terminal device to release the SIM card by the server 400, if the use status is idle.

In this embodiment of the present disclosure, when the SIM card is determined as being in the idle state in step 202, a request of releasing the SIM card is sent to the terminal device 13 which is using the SIM card to cause the terminal 13 to release the SIM card, the SIM card will be in a non-occupied state after it is released, and may be allocated to other terminal devices to be used.

As one embodiment of the present disclosure, after the terminal device 13 is instructed to release the SIM card, the released SIM card is marked as a frozen state in a preset period of time, that is, the SIM card is released so that it is in the non-occupied state, and this SIM card would not be allocated to any other terminal device to be used in this period of time. If the terminal device 13 which has released the SIM card requests to use the SIM card again during this period of time, the SIM card which is marked as the frozen state is directly allocated to the terminal device 13 to be used; if the terminal device 13 doesn't request to use the SIM card during this period of time, this SIM card is fully released and is allowed to be allocated to other terminal devices to be used. By marking the released SIM card as the frozen state, the step of screening an appropriate SIM card in the cloud SIM card pool 11 according to the SIM card use request of the terminal device 13 is omitted in the event that the SIM card with an non-idle state is mistakenly released and the terminal device 13 which has released the target SIM card requests to use the SIM card immediately, so that an operation pressure of a server 12 is reduced, the time spent on allocating the SIM card to the terminal device 13 is reduced, and a negative effect caused by mistakenly releasing the SIM card in the non-idle state is also reduced.

Step 204, acquiring, by the server 400, SIM card using request data sent from the terminal device 13.

In this embodiment of the present disclosure, due to the fact that the use status of the SIM card cannot be completely correctly identified by the preset recognition model, moreover, at an early stage of use of the preset recognition model, due to the fact that dynamic optimization is not performed or the degree of optimization is much lower, an accuracy rate of determination may be relatively low; a part of SIM cards in these SIM cards determined as being in the idle state may be in the non-idle state actually, when the terminal device 13 is instructed to release this part of target SIM cards, the terminal device 13 would request to use the SIM card again soon when the user is using network service, so that the terminal device 13 may take the data including the SIM card using request data reissued by the terminal device 13 after the SIM card is released, the data traffic used during a period of time after the SIM card is re-allocated and use time as feedback data for determining the use status.

Step 205, optimizing the preset recognition model according to the SIM card using request data to determine the SIM card use status according to the optimized recognition model by the server 400.

After the SIM card using request data reissued by the terminal device 13 is acquired after releasing the SIM card and taking this SIM card using request data as the feedback data, the recognition model is further adjusted according to whether the determination of the use status is correct in the data verification step 202, so that the recognition model is optimized and the accuracy of determination is improved.

Figure 5:
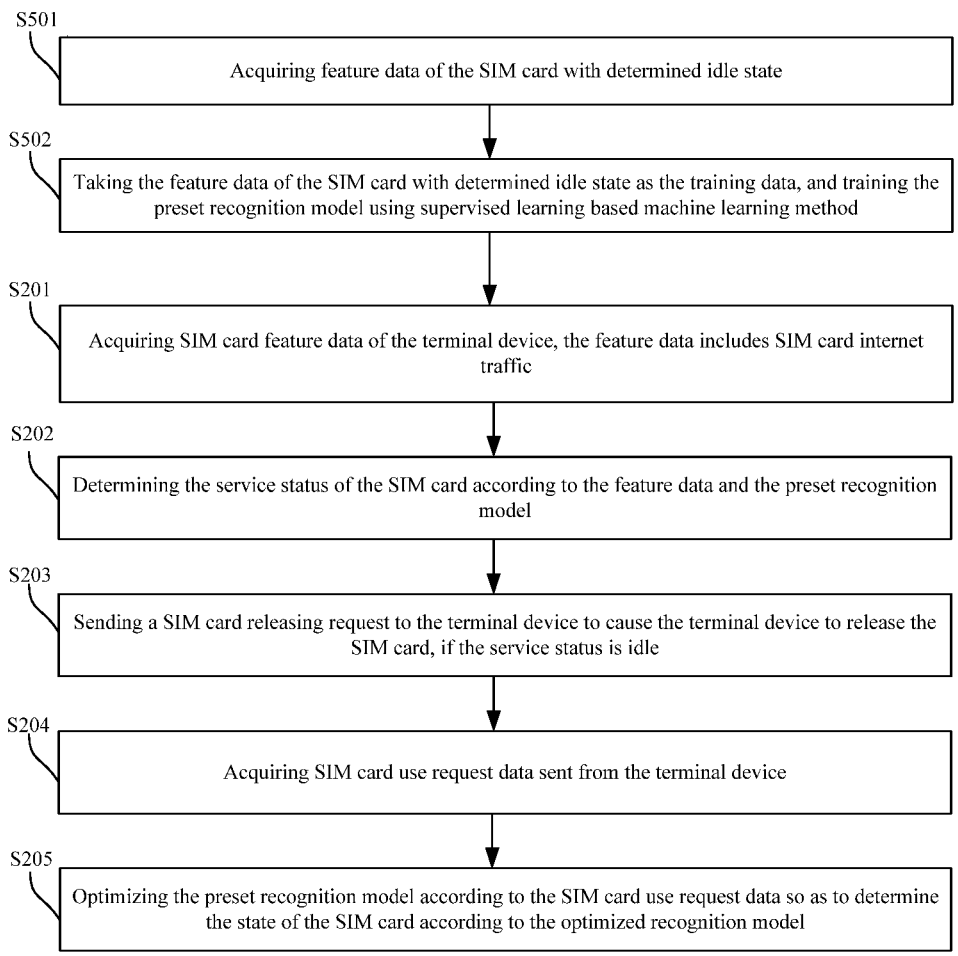
FIG. 5 is a schematic diagram of steps of one preferable SIM card status determination method according to an embodiment of the present disclosure.

As shown in FIG. 5, in this embodiment of the present disclosure, prior to step 202, the SIM card use status determination method further comprises:

step 501, acquiring feature data of the SIM card with a determined use status by the server 400; and step 502, taking the feature data of the SIM card with determined use status as training data, and training the preset recognition model using a supervised learning algorithm by the server 400.

Both the step 501 and the step 502 are prior to step 201.

It needs to be noted that, steps 501 and 502 may either be performed before step 202 and after step 201 or be performed before step 201, the functions of steps 501 and 502 are not affected, as long as steps 501 and 502 are prior to step 202, and step 501 is prior to step 502, the order of these steps should all be included in the claimed protection scope of the present disclosure.

In this embodiment of the present disclosure, steps 501 and 502 are prior to step 201.

Step 501, acquiring the feature data of the SIM card with determined use status by the server 400.

The feature data of the SIM card with determined use status is not required to be real-time feature data, it may also be historical feature data, complete historical feature data need not be acquired, it is possible to merely acquire historical feature data in a certain historical period. Due to the historical feature data, whether the SIM card is in an idle state in the historical period may be determined according to factors including the historical network service access condition of the SIM card, data request and the value of data traffic, moreover, the historical feature in this historical period is used as the feature data of the SIM card with determined use status.

The feature data of the SIM card with determined use status may be screened out in advance according to manual offline analysis manner and stored in the memory, so that this data may be acquired when the step 501 is performed, the data may also be acquired by using a machine according to an automatic screening approach.

Step 502, taking the feature data of the SIM card with determined use status as training data, and training the preset recognition model using a supervised learning algorithm by the server 400.

After the feature data of the SIM card with determined use status is acquired, the feature data is used as the training data used in machine learning, and a supervised learning algorithm such as decision tree, random forest, Bayesian classification algorithm and the like is adopted to train the recognition model used for identifying a SIM card in an idle state, and this recognition model is used as the preset recognition model used in the step 202. Which algorithm is specifically adopted is not limited in the present disclosure, an algorithm needs to be selected according to the actual condition.

Figure 6:
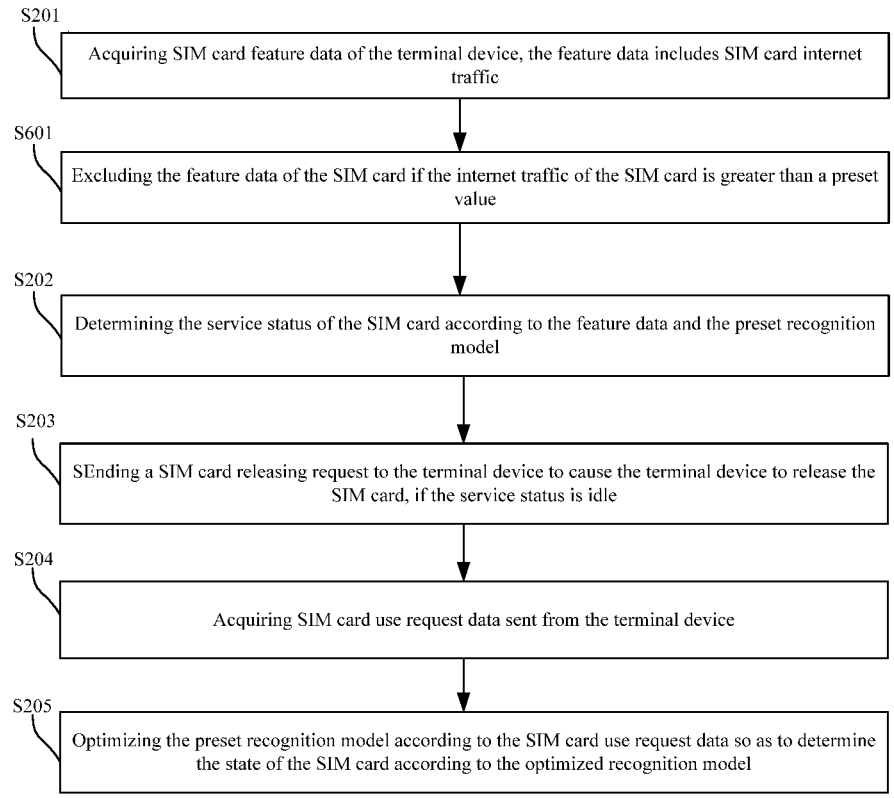
FIG. 6 is a schematic diagram of steps of another preferable SIM card status determination method according to an embodiment of the present disclosure.

As shown in FIG. 6, in this embodiment of the present disclosure, the SIM card use status determination method further includes a step 601 of excluding the feature data of the SIM card if the data traffic of the SIM card is greater than a preset threshold value before step 202.

A threshold value of data traffic of the SIM card is selected, the SIM card is unlikely or nearly unlikely to be in the idle state if the data traffic of the SIM card is greater than the threshold value in the recent certain time; then, the threshold value is used as the preset value in this step, so that SIM cards may be preliminarily screened, the SIM card feature data greater than the preset threshold value is excluded, the amount of feature data that needs to be determined in the step 202 is reduced, and the execution speed is accelerated.

Figure 7:
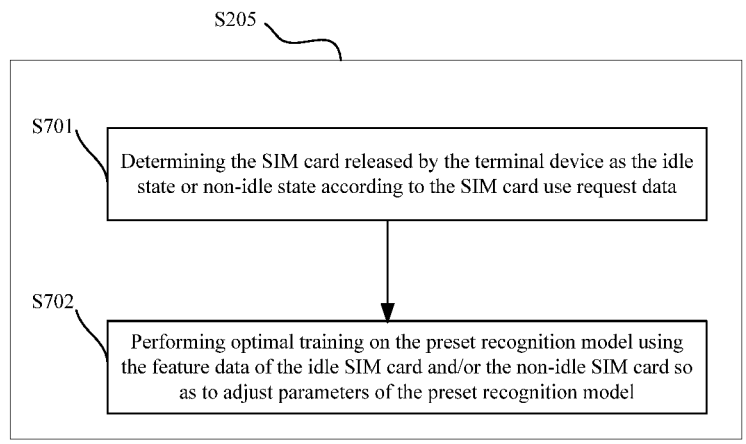
FIG. 7 is a schematic diagram of steps of another preferable SIM card status determination method according to an embodiment of the present disclosure.

As shown in FIG. 7, in this embodiment of the present disclosure, step 205 specifically includes step 701 and step 702, which are described in detail below:

Step 701, determining the SIM card released by the terminal device 13 as an idle SIM card or non-idle SIM card according to the SIM card using request data by the server 400.

After acquiring the SIM using request data sent by the terminal device 13, the SIM card using request data is taken as the feedback data which further determines the use status of the released SIM card, so that the use status of the released SIM card is determined as idle or non-idle; after determination of the use status of the released SIM card is completed, the feature data of the SIM card may be stored in a specific area so as to be acquired later, and may also be marked so as to be quickly retrieved and called when subsequent steps are performed. For example, after the SIM card is released by the terminal device 13, the target SIM card is determined as the idle SIM card in the event that the terminal device 13 has never requested to use the SIM card for a long period of time after releasing of the SIM card; otherwise, the SIM card is determined as the non-idle SIM card if the terminal device 13 has requested to use the SIM card immediately after the SIM card is released by the terminal device 13.

Step 702, using the feature data of the idle SIM card and/or the non-idle SIM card to perform optimal training on the preset identification model by the server 400 so as to adjust a parameter of the preset identification model.

After the released SIM card is determined as the idle SIM card or non-idle SIM card, the feature data of the idle SIM card and/or the non-idle SIM card stored in the specific area is acquired or the feature data of the SIM card which is marked as idle or non-idle is retrieved and called, this feature data is used as optimization data to perform the optimal training on the preset identification model in the step 202 so as to improve a recognition accuracy; moreover, since optimization may be performed periodically and may also be performed in real time, the preset identification model may be adjusted in real time. The supervised learning algorithm such as decision tree, random forest, Bayesian classification algorithm, artificial neural network and the like is also applied in an optimal training approach. An error rate is very low due to the fact that the target SIM card determined as idle SIM card or non-idle SIM card has passed a feedback verification of the terminal device 13, so that the feature data of the idle SIM cards and the non-idle SIM cards are used as the optimization data to perform optimal training on the preset identification model in the step 202, identification parameters of the preset identification model are adjusted to conform to the actual condition of the SIM card better according to optimal training, an identification accuracy of use status of the SIM card is improved; moreover, since the optimal training may be performed in real time, performing dynamic optimization automatically according to actual service condition may be realized accordingly.

In this embodiment of the present disclosure, the step 701 specifically includes: determining the SIM card as the idle SIM card if the terminal device doesn't request to use the SIM card in the preset period of time by the server 400; or determining the SIM card as the non-idle SIM card by the server 400 if the terminal device requests to use the SIM card in the preset period of time, according to the SIM card using request data of the terminal device 13 in the preset period of time after the SIM card is released.

In this embodiment of the present disclosure, the SIM card using request data of the terminal device 13 in the preset period of time after releasing the SIM card is acquired, the preset period of time is a period of time after the SIM card is released by the terminal device 13, the period of time setting is set to be shorter; if the terminal device 13 doesn't request to use the SIM card again during the period of time, it indicates that the SIM card is determined as the idle SIM card; conversely, the SIM card is determined as the non-idle SIM card if the terminal device 13 requests to use the SIM card again during this period of time. For example, A SIM card use request record within 30 seconds after the SIM card is released by the terminal device 13 is acquired, the SIM card is determined as an idle SIM card if the terminal device 13 doesn't request to use the SIM card within the 30 seconds; otherwise, the SIM card is determined as a non-idle SIM card.

The SIM card status determination method provided by the present disclosure is applicable to the SIM card stored in a cloud SIM card pool and allocated to the terminal device to be used through the server, SIM card feature data of the terminal device 13 which contains SIM card data traffic is acquired, and the use status of the SIM card is determined according to the feature data and the preset recognition model, if the SIM card is in an idle state, a SIM card releasing request is sent to the terminal device 13 to release the SIM card, after the SIM card is released, the SIM card using request data sent by the terminal device 13 is acquired, and the recognition model is further optimized according to the SIM card using request data, so that the optimized recognition model is used to determine the use status of the SIM card, and a purpose of improving the determination accuracy is ultimately achieved.

The ordinarily skilled one in the art may be aware of that, a whole or part of flow process of implementing the method in the embodiments of the present disclosure mentioned above may be accomplished by using a computer program to instruct relevant hardware. The computer program may be stored in a computer readable storage medium which may be such as ROM (Read-Only Memory)/RAM (Random Access Memory), magnetic disk, optical disk, flash disk, and so on.

The embodiment of the present disclosure further provides a server 400 including a processor 401 and a system memory 404.

The processor 401 is configured to execute computer program stored in the system memory 404 so as to implement steps of acquiring SIM card feature data of a terminal device 13, where the feature data includes SIM card data traffic;

determining a use status of the SIM card according to the feature data and a preset recognition model;

sending a SIM card releasing request to the terminal device to cause the terminal device 13 to release the SIM card, if the use status is determined as idle;

acquiring SIM card using request data sent by the terminal device 13; and optimizing the preset recognition model according to the SIM card using request data so as to determine the use status of the SIM card according to optimized recognition model.

In one embodiment, before the step of determining a use status of the SIM card according to the feature data and a preset recognition model, the processor 401 is further configured to execute the computer program in the system memory 404 to implement steps of acquiring feature data of the SIM card with a determined use status; and taking the feature data of the SIM card with the determined use status as training data, and training the preset recognition model using a supervised learning algorithm.

In one embodiment, the processor 401 is further configured to implement steps of excluding the feature data of the SIM card if the data traffic of the SIM card is greater than a preset value, before the step of determining a use status of the SIM card according to the feature data and a preset recognition model.

In one embodiment, the processor 401 is specifically configured to implement the step of optimizing the preset recognition model according to the SIM card using request data so as to determine the use status of the SIM card according to optimized recognition model by determining the SIM card released by the terminal device as an idle SIM card or a non-idle SIM card according to the SIM card using request data; and performing an optimal training on the preset recognition model using the feature data of the idle SIM card and/or the non-idle SIM card so as to adjust parameters of the preset recognition model.

In one embodiment, the processor 401 is specifically configured to implement the step of determining the SIM card released by the terminal device as an idle SIM card or a non-idle SIM card according to the SIM card using request data by determining the SIM card as the idle SIM card if the terminal device 13 doesn't request to use the SIM card in the preset period of time, or determining the SIM card as the non-idle SIM card if the terminal device 13 requests to use the SIM card in the preset period of time, according to the SIM card using request data of the terminal device 13 in a preset period of time after the SIM card is released by the terminal device 13.

In one embodiment, the processor 401 is further configured to implement the step of marking the released SIM card as a frozen state in a preset period of time; and directly allocating the SIM card marked as the frozen state to the terminal device to be used, if the terminal device 13 which has released the SIM card requests to use the SIM card again during this period of time; or fully releasing this SIM card and allowing the SIM card to be allocated to other terminal devices to be used, if the terminal device 13 doesn't request to use the SIM card during this period of time, after the step of sending a SIM card releasing request to the terminal device 13 to cause the terminal device 13 to release the SIM card by the server 400, if the use status is determined as idle.

In one embodiment, the processor 401 is specifically configured to implement the step of optimizing the preset recognition model according to the SIM card using request data so as to determine the use status of the SIM card according to optimized recognition model by:

acquiring the SIM card using request data reissued by the terminal device 13 after the SIM card is released and taking the acquired SIM card using request data as feedback data to further adjust the recognition model according to whether a determination of use status of the SIM card is correct.

Embodiments of the present disclosure further provide a computer readable storage medium, a computer program is stored in the computer readable storage medium, when the computer readable storage medium is executed by a processor, the steps of the SIM card status determination method provided by the embodiments of the present disclosure described above are implemented.

Figure 8:
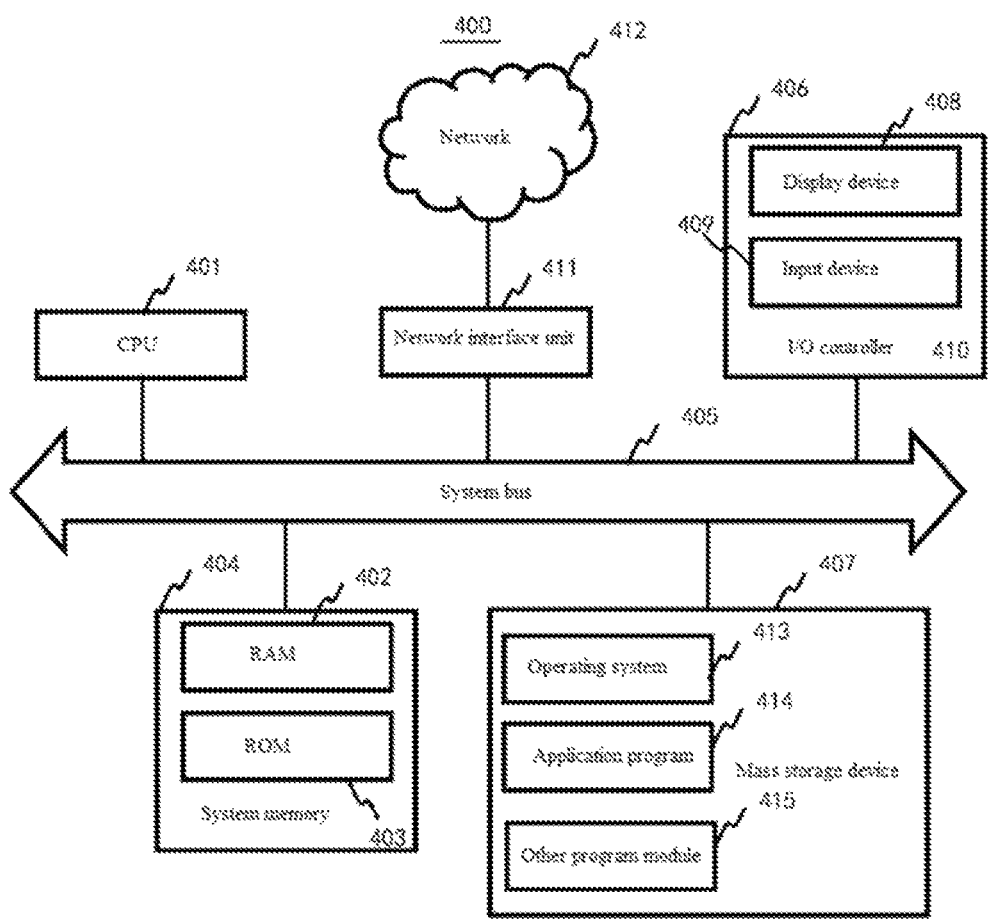
FIG. 8 is a schematic structural diagram of a server according to san embodiment of the present disclosure.

FIG. 8 illustrates a schematic structural diagram of a server 400 provided by one embodiment of the present disclosure.

The server 12 may apply this structure to implement the SIM card status determination method provided in the embodiments as described above.

Server 400 includes a CPU (Central Processing Unit) 401, a system memory 404 which includes a RAM (Random Access Memory) 402 and a ROM (Read Only Memory) 403, and a system bus 405 that connects the system memory 404 and the CPU 401, the server 400 further includes a basic I/O (input/output) system 406 that facilitates information transmission among various components within a computer, and a mass storage device 407 configured to store an operating system 413, an application program 414, and other program modules 415.

The basic I/O system 406 includes a display device 408 configured to display information and an input device 409 for user to input information, such as a mouse, a keyboard, etc. Where both the display device 408 and the input device 409 are connected to the CPU 401 through an input/output controller 410 connected to the system bus 405. The basic I/O system 406 may also include the input/output controller 410 configured to receive and process input from other devices such as the keyboard, the mouse or electronic touch control stylus. Similarly, the input/output controller 410 also provides an output to an output device such as a display screen, a printer, or other type of output device.

The mass storage device 407 is connected to the CPU 401 through a mass storage controller (not shown) connected to the system bus 405, the mass storage device 407 and its associated computer readable medium provide the server 400 with a non-volatile storage. That is, the mass storage device 407 may include a computer-readable medium (not shown) such as a hard disk or a CD-ROM drive.

Without loss of generality, the computer readable medium may include computer storage media and communication media. The computer storage medium includes volatile and non-volatile, removable and irremovable medium which are implemented by any method or technology for storing information such as a computer readable instruction, a data structure, a program module or other data, and so on. The computer storage medium includes RAM, ROM, EPROM (Electrically Programmable Read Only Memory), EEPROM (Electrically Erasable Programmable Read Only Memory), flash memory or other solid state storage technology, CD-ROM (Compact Disc Read Only Memory), DVD (Digital Video Disc) or other optical storage, magnetic cassette, magnetic tape, magnetic disk storage or other magnetic storage devices. Of course, those skilled in the art may be aware of that the aforesaid computer storage medium is not limited by the storage medium set forth above. The system memory 404 and the mass storage device 407 described above may be collectively referred to as the memory.

According to the various embodiments of the present disclosure, the server 400 may also be operated by connecting to a remote computer through a network such as the Internet. That is, the server 400 may be connected to the network 412 through a network interface unit 411 that is connected to the system bus 405; as an alternative, the server 400 may be connected to other types of networks or remote computer systems (not shown) using the network interface unit 411.

The memory also includes one or more computer programs stored in the memory and configured to be executed by one or more CPUs 401. The one or more computer programs include the SIM card status determination method as shown in FIG. 2, FIG. 5, FIG. 6 or FIG. 7.

The person of ordinary skill in the art may be aware of that, a whole or part of steps for implementing the SIM card status determination method in the aforesaid embodiments may be accomplished by a hardware, and may be accomplished by using a computer program to instruct relevant hardware, this computer program is stored in a computer readable storage medium, the storage medium mentioned above may be ROM (Read-Only Memory), magnetic disk, optical disk, and so on.

According to the embodiment of the present disclosure, the SIM card feature data of the terminal device 13 which contains SIM card data traffic is acquired, and the use status of the SIM card is determined according to the feature data and the preset recognition model, if the SIM card is in an idle state, a SIM card releasing request is sent to the terminal device 13 so as to release the SIM card; after the SIM card is released, the SIM card using request data sent by the terminal device 13 is acquired, and the recognition model is further optimized according to the SIM card using request data, so that the optimized recognition model is used to determine the use status of the SIM card, and a purpose of improving the determination accuracy is ultimately achieved.

As stated above, the aforesaid embodiments are merely intended to explain but not to limit the technical solutions of the present disclosure. Although the present disclosure has been explained in detail with reference to the embodiments as mentioned above, it should be understood by the ordinary skilled one in the art that, the technical solutions described in each of the above-described embodiments can still be amended, or some technical features in the technical solutions may be replaced equivalently; these amendments or equivalent replacements, which won't make the essence of corresponding technical solution to be broken away from the spirit and the scope of the technical solution in various embodiments of the present disclosure, should all be included in the protection scope of the present disclosure.

What is claimed is:

1. A SIM card status determination method, wherein the SIM card is the one stored in a cloud SIM card pool and being assigned to a terminal device to be used through a server, the method comprises steps of:

acquiring SIM card feature data of a terminal device by the server, wherein the feature data comprises SIM card data traffic;

determining a use status of the SIM card by the server according to the feature data and a preset recognition model;

sending a SIM card releasing request to the terminal device to cause the terminal device to release the SIM card by the server, if the use status is determined as idle;

acquiring, by the server, SIM card using request data sent by the terminal device; and optimizing, by the server, the preset recognition model according to the SIM card using request data so as to determine the use status of the SIM card according to optimized recognition model.

2. The method according to claim 1, further comprising:
before the step of determining a use status of the SIM card by the server according to the feature data and a preset recognition model, acquiring feature data of the SIM card with a determined use status by the server; and taking the feature data of the SIM card with the determined use status as training data, and training the preset recognition model using a supervised learning algorithm by the server.

3. The method according to claim 1, further comprising:
before the step of determining a use status of the SIM card according to the feature data and a preset recognition mode, excluding the feature data of the SIM card by the server if the data traffic of the SIM card is greater than a preset value.

4. The method according to claim 1, wherein the step of optimizing, by the server, the preset recognition model according to the SIM card using request data so as to determine the use status of the SIM card according to optimized recognition model specifically comprises:

determining the SIM card released by the terminal device as an idle SIM card or a non-idle SIM card according to the SIM card using request data by the server; and performing, by the server, an optimal training on the preset recognition model using the feature data of the idle SIM card and/or the non-idle SIM card so as to adjust parameters of the preset recognition model.

5. The method according to claim 4, wherein the step of determining the SIM card released by the terminal device as an idle SIM card or a non-idle SIM card according to the SIM card using request data by the server specifically comprises:

determining the SIM card as the idle SIM card by the server if the terminal device doesn't request to use the SIM card during the preset period of time, or determining the SIM card as the non-idle SIM card by the server if the terminal device requests to use the SIM card in the preset period of time, according to the SIM card using request data of the terminal device during a preset period of time after the SIM card is released by the terminal device.

6. A computer readable storage medium which stores a computer program, wherein when the computer program is executed by a processor, steps in the method according to claim 1 are implemented.

7. The method according to claim 1, further comprising:
after the step of sending a SIM card releasing request to the terminal device to cause the terminal device to release the SIM card by the server, if the use status is determined as idle specifically comprises:

marking, by the server, the released SIM card as a frozen state in a preset period of time; and directly allocating, by the server, the SIM card marked as the frozen state to the terminal device to be used, if the terminal device which has released the SIM card requests to use the SIM card again during the preset period of time; or fully releasing this SIM card and allowing the SIM card to be allocated to other terminal devices to be used, if the terminal device doesn't request to use the SIM card during this preset period of time.

8. The method according to claim 1, wherein the step of optimizing, by the server, the preset recognition model according to the SIM card using request data so as to determine the use status of the SIM card according to optimized recognition model specifically comprises:

acquiring the SIM card using request data reissued by the terminal device after the SIM card is released and taking the acquired SIM card using request data as feedback data to further adjust the recognition model according to whether a determination of use status of the SIM card is correct.

9. A server, comprising a processor configured to execute a computer program stored in a system memory so as to implement steps of:

acquiring SIM card feature data of a terminal device, wherein the feature data comprises SIM card data traffic;

determining a use status of the SIM card according to the feature data and a preset recognition model;

sending a SIM card releasing request to the terminal device to cause the terminal device to release the SIM card, if the use status is determined as idle;

acquiring SIM card using request data sent by the terminal device; and optimizing the preset recognition model according to the SIM card using request data so as to determine the use status of the SIM card according to optimized recognition model.

10. The server according to claim 9, wherein the processor is further configured to execute the computer program in the memory to implement:

before the step of determining a use status of the SIM card according to the feature data and a preset recognition model, acquiring feature data of the SIM card with a determined use status; and taking the feature data of the SIM card with the determined use status as training data, and training the preset recognition model using a supervised learning algorithm.

11. The server according to claim 9, wherein the processor is further configured to execute the computer program in the memory to implement:

excluding the feature data of the SIM card if the data traffic of the SIM card is greater than a preset value, before the step of determining a use status of the SIM card according to the feature data and a preset recognition model.

12. The server according to claim 9, wherein the processor is specifically configured to implement the step of optimizing the preset recognition model according to the SIM card using request data so as to determine the use status of the SIM card according to optimized recognition model by determining the SIM card released by the terminal device as an idle SIM card or a non-idle SIM card according to the SIM card using request data; and performing an optimal training on the preset recognition model using the feature data of the idle SIM card and/or the non-idle SIM card so as to adjust parameters of the preset recognition model.

13. The server according to claim 12, wherein the processor is specifically configured to implement the step of determining the SIM card released by the terminal device as an idle SIM card or a non-idle SIM card according to the SIM card using request data by determining the SIM card as the idle SIM card if the terminal device doesn't request to use the SIM card in the preset period of time, or determining the SIM card as the non-idle SIM card if the terminal device requests to use the SIM card in the preset period of time, according to the SIM card using request data of the terminal device in a preset period of time after the SIM card is released by the terminal device.

14. The server according to claim 9, wherein the processor is further configured to implement the step of marking the released SIM card as a frozen state in a preset period of time; and directly allocating the SIM card marked as the frozen state to the terminal device to be used, if the terminal device which has released the SIM card requests to use the SIM card again during this period of time; or fully releasing this SIM card and allowing the SIM card to be allocated to other terminal devices to be used, if the terminal device doesn't request to use the SIM card during this period of time, after the step of sending a SIM card releasing request to the terminal device to cause the terminal device to release the SIM card by the server, if the use status is determined as idle.

15. The server according to claim 9, wherein the processor is specifically configured to implement the step of optimizing the preset recognition model according to the SIM card using request data so as to determine the use status of the SIM card according to optimized recognition model by:
    acquiring the SIM card using request data reissued by the terminal device after the SIM card is released and taking the acquired SIM card using request data as feedback data to further adjust the recognition model according to whether a determination of use status of the SIM card is correct.

\* \* \* \* \*